United States Patent
Boesjes et al.

(10) Patent No.: US 7,343,330 B1
(45) Date of Patent: Mar. 11, 2008

(54) SYSTEMS AND METHODS FOR ACQUISITION, EVALUATION, INVENTORY, DISTRIBUTION, AND/OR RE-SALE OF PRE-OWNED RECORDED DATA PRODUCTS

(76) Inventors: Eimar M. Boesjes, BMH, Inc., 1754 Moonshadow, Eugene, OR (US) 97405;
Timothy C. A. Molteno, BMH, Inc., 1754 Moonshadow, Eugene, OR (US) 97405

( * ) Notice: Subject to any disclaimer, the term of this patent is extended or adjusted under 35 U.S.C. 154(b) by 1117 days.

(21) Appl. No.: 09/893,293

(22) Filed: Jun. 26, 2001

(51) Int. Cl.
*G06Q 10/00* (2006.01)
(52) U.S. Cl. .......................... 705/28; 705/16
(58) Field of Classification Search ............... 705/16, 705/28; 283/56
See application file for complete search history.

(56) References Cited

U.S. PATENT DOCUMENTS

| | | | | |
|---|---|---|---|---|
| 5,754,648 A | * | 5/1998 | Ryan et al. | 380/201 |
| 5,754,649 A | * | 5/1998 | Ryan et al. | 380/203 |
| 5,857,707 A | * | 1/1999 | Devlin | 283/56 |
| 6,327,307 B1 | * | 12/2001 | Brailean et al. | 375/240.29 |
| 6,415,264 B1 | * | 7/2002 | Walker et al. | 705/26 |
| 6,535,469 B1 | * | 3/2003 | Heylen | 369/53.21 |
| 6,614,914 B1 | * | 9/2003 | Rhoads et al. | 382/100 |
| 6,652,455 B1 | * | 11/2003 | Kocher | 600/300 |
| RE38,353 E | * | 12/2003 | Peterson | 700/234 |
| 6,738,331 B2 | * | 5/2004 | Pirot et al. | 369/53.21 |
| 6,738,364 B1 | * | 5/2004 | Saunders | 370/332 |
| 6,779,719 B2 | * | 8/2004 | Guindulain Vidondo | 235/381 |
| 6,791,580 B1 | * | 9/2004 | Abbott et al. | 709/203 |
| 6,803,926 B1 | * | 10/2004 | Lamb et al. | 715/744 |
| 6,816,972 B1 | * | 11/2004 | Kutaragi et al. | 713/200 |
| 6,819,924 B1 | * | 11/2004 | Ma et al. | 455/425 |
| 6,826,538 B1 | * | 11/2004 | Kalyan et al. | 705/7 |

OTHER PUBLICATIONS

Kelly, Entertainment:SHOW 1993.*

* cited by examiner

*Primary Examiner*—Andrew Joseph Rudy
*Assistant Examiner*—Vanel Frenel
(74) *Attorney, Agent, or Firm*—David S. Alavi

(57) ABSTRACT

Data integrity of recorded data products is quantitatively evaluated by enumeration of unreadable, uncorrected, and/or corrected data subsets, and/or by measuring over-sampling of corrected data subsets. Quantitative data integrity evaluation facilitates commerce in pre-owned data products, through pre-owned product re-sellers and/or directly between owners and buyers. Quantitative data integrity evaluation, in conjunction with pre-owned product commerce or performed independently, provides opportunities for gathering product information for data products, including content signature or other unique content-identifying data, for incorporation into product information database(s). Data integrity evaluation, pre-owned data product commerce, and/or data product information gathering may be conducted online. Data integrity evaluation, pre-owned product commerce, and/or data product information gathering may provide opportunities for revenue generation.

21 Claims, 3 Drawing Sheets

SYSTEMS AND METHODS FOR ACQUISITION, EVALUATION, INVENTORY, DISTRIBUTION, AND/OR RE-SALE OF PRE-OWNED RECORDED DATA PRODUCTS

FIELD OF THE INVENTION

The field of the present invention relates to commerce in pre-owned data products. In particular, systems and methods are disclosed herein for acquisition, evaluation, inventory, distribution, and/or re-sale of pre-owned recorded data products.

BACKGROUND

This application is related to the subject matter of prior-filed co-pending non-provisional application Ser. No. 09/874,481, filed Jun. 4, 2001 in the name of Eimar M. Boesjes, said application being hereby incorporated by reference as if fully set forth herein.

The used, or pre-owned, CD and DVD markets are substantial. In the US alone, it is estimated that at least 500 million used CD's are re-sold annually at an average price of $5 to $6 each, producing an estimated revenue stream of $2.5-$3 billion. Many music retailers purchase pre-owned CDs and DVDs from the public. When deciding whether to purchase a pre-owned CD from an owner, a retail clerk visually judges the quality of the CD and estimates its monetary value. This visual check is error prone. When not sufficiently schooled, or when under time pressure at the check out counter, clerks can easily make errors in judging the quality of the CD offered by the owner for purchase. As a result inferior product may be purchased. The judgment of the potential re-sale value of the CD is even more difficult. To judge the value of a CD the clerk needs to estimate what the demand is for a certain product. To do this, the clerk would need to know the market well, which is difficult with a current inventory of over 200,000 products, and at least 200,000 more historic products. As a result CDs are often purchased having little or no re-sale value. In addition, the clerk needs to know, preferably instantly, if a certain pre-owned CD is already in stock. Entering pre-owned CD into instantly-accessible computer systems is labor intensive, therefore many retailers do not do this and thus they may often purchase pre-owned CDs already in stock.

Another problem with the pre-owned CD/DVD market is that it is difficult to match supply and demand. Supply and demand are matched currently only on a per store basis. A CD is re-sold only if it is first purchased by a re-seller (usually a retailer), and then purchased from that same specific retailer. As a result, a music CD is only re-sold if a buyer for that CD comes to that specific store, checks out their inventory of used CDs and finds the CD he/she is looking for. It may very well be that the used CD that the buyer is looking for is available from another store two blocks away, but there is no way for him/her to know without going to the other store and browse the racks. If the retailers would pool their inventories of used CDs/DVDs they would increase the re-sale rate, reduce inventory, and serve their customers better. Pooling order, inventory, and sales information would enable them to properly determine purchase and re-sale prices.

An additional determinant of the value of a data product such as a CD or DVD is the integrity of the data recorded on the data product. For example, a music CD having several unplayable tracks or numerous "pops" or skips may be worth less to a potential buyer and therefore also less to a re-seller. The same would apply to a software disc having one or more corrupted files. Hardware and/or software utilities exist which may give an overall "good" or "bad" rating for a data product, but these products are limited in the level of detail of the status of the recorded data. A typical example merely reads through the sectors of a CD until reaching an unreadable sector. If such a sector is found, the reading is stopped and the CD is deemed "bad"; if the entire CD is read without finding such a sector, the CD is deemed "good". No location information is provided for the bad sector, and no information is available at all regarding the integrity of the data in the unread sectors. Furthermore, many recorded data products such as CDs and DVDs have data sets that include error-correaction codes (ECCs), enabling data that was initially erroneously read to be re-read (perhaps multiple times, i.e., over-sampled) and the error-correaction codes used to correct the erroneously-read data. Typical readout devices for recorded data do not provide information pertaining to the degree to which any of the recorded data was over-sampled. Such information may be valuable in determining the likelihood of future failure of a recorded data product that may be presently readable (albeit with data correaction).

It is often useful when offering products for sale to have available a database of product-related information that may be accessed by sellers and/or buyers of the products. This has become even more desirable with the increasing importance of online product sales (so-called "e-commerce"). Such information (title, artist, track information, and so forth for music CDs, for example) may routinely be generated of collected in a product information database for new products, but gathering such information for older products, especially those no longer actively produced, may be problematic. Commerce in pre-owned data products coupled with data integrity evaluation provides an opportunity to gather such information. In addition, it has become desirable to develop systems wherein specific data product content may be recognized from the content itself (as opposed to a title, UPC, or the like). Any system for accomplishing this requires a database of unique identifying information for a data product (or subset thereof) based on the data content itself. Once again, such identification information may be routinely generated and provided for new data products, but only with difficulty for older data products. Commerce in used data products coupled with data integrity evaluation provides an opportunity to generate and gather such information.

It is therefore desirable to provide systems and methods for acquisition, evaluation, inventory, distribution, and/or re-sale of pre-owned recorded data products that addresses these issues. It is desirable to provide systems and methods whereby the data integrity of a data product is quantitatively evaluated, as a whole and/or by data subset. It is desirable to provide systems and methods whereby a data integrity rating, inventory information, order information, and/or sales information are used to determine purchase and/or re-sale prices for a pre-owned data product. It is desirable to provide systems and methods whereby pre-owned products acquired by a re-seller may be offered for sale to buyers through multiple other re-sellers. It is desirable to provide systems and methods whereby pre-owned products acquired by multiple other re-sellers may be offered for re-sale to a buyer through a re-seller. It is desirable to provide systems and methods whereby data integrity ratings, inventory information, order information, and/or sales information are made accessible online. It is desirable to provide systems and methods whereby data product information is collected and/or generated in conjunction with data integrity content evaluation. It is desirable to provide systems and methods whereby data product content signatures and/or other data-content-based identifiers are collected/generated in conjunction with data integrity evaluation.

SUMMARY

Certain aspects of the present invention may overcome one or more aforementioned drawbacks of the previous art and/or advance the state-of-the-art of acquisition, evaluation, inventory, distribution, and/or re-sale of pre-owned recorded data products, and in addition may meet one or more of the following objects:

To provide systems and methods for acquisition, evaluation, inventory, distribution, and/or re-sale of pre-owned recorded data products;

To provide systems and methods whereby the data integrity of a data product is quantitatively evaluated, as a whole and/or by data subset;

To provide systems and methods whereby a data integrity rating, inventory information, order information, and/or sales information are used to determine purchase and/or re-sale prices for a pre-owned data product;

To provide systems and methods whereby pre-owned products acquired by a re-seller may be offered for sale to buyers through multiple other re-sellers;

To provide systems and methods whereby pre-owned products acquired by multiple other re-sellers may be offered for re-sale to a buyer through a re-seller;

To provide systems and methods whereby data integrity ratings, inventory information, order information, and/or sales information are made accessible online;

To provide systems and methods whereby data product information is collected and/or generated in conjunction with data integrity content evaluation; and To provide systems and methods whereby data product content signatures and/or other data-content-based identifiers are collected/generated in conjunction with data integrity evaluation.

One or more of the foregoing objects may be achieved in the present invention by a method for acquisition, evaluation, inventory, distribution, and re-sale of pre-owned data products comprising the steps of: reading data from a data product offered by an owner of the data product; comparing data read from the data product with data in a data product information database; identifying the data product; quantitatively evaluating the integrity of a data set recorded on the data product and computing a data integrity rating for the data product; determining a purchase price to be offered by the re-seller to the owner, the purchase price being determined based on the data integrity rating, inventory information, order information, and/or previous purchase and re-sale information; updating inventory and/or sales databases in response to a purchase from the owner by the re-seller; determining a re-sale price to be offered by the re-seller to a buyer, the price being determined based on the data integrity rating, inventory information, order information, and/or previous purchase and re-sale information; and updating inventory, order, and/or sales databases in response to a sale by the re-seller to the buyer. Methods according to the present invention may be implemented to enable participation of multiple re-sellers, and for enabling online access by owners, buyers, and/or re-sellers to system databases.

The foregoing method may be implemented by a system comprising: a readout device adapted for reading a data set recorded on the data product; at least one of a data product information database, a data product inventory data base, a data product order database, and a data product sales database; and a programmed processor, operatively linked to the databases and the readout device, for performing the foregoing method steps. The readout device, databases, and/or processor may be accessible online.

One or more of the foregoing objects may be achieved in the present invention by a method for quantitatively evaluating the integrity of a data set recorded on a storage medium including error-correaction codes, the method comprising the steps of: enumerating data subsets that are initially erroneously read and subsequently corrected; and computing a data integrity rating based on the enumeration. The data integrity rating may be further based on an over-sampled rating for erroneously-read-and-corrected data subsets, and may be further based on enumeration of unreadable and/or erroneously-read-and-uncorrected data subsets. A system for implementing the foregoing method comprises a readout device for reading the data set from the storage medium, and a programmed processor for performing the foregoing method steps. The system may be made accessible online.

Systems and methods according to the present invention may be implemented: for enabling direct access (online or otherwise) by owners and buyers to system databases; for enabling direct transactions (online or otherwise) between owners and buyers; for facilitating data product information gathering (including gathering of content signature or other content-specific identification information) for storage in data product information databases(s).

Additional objects and advantages of the present invention may become apparent upon referring to the preferred and alternative embodiments of the present invention as illustrated in the drawings and described in the following written description and/or claims.

Figure 1:
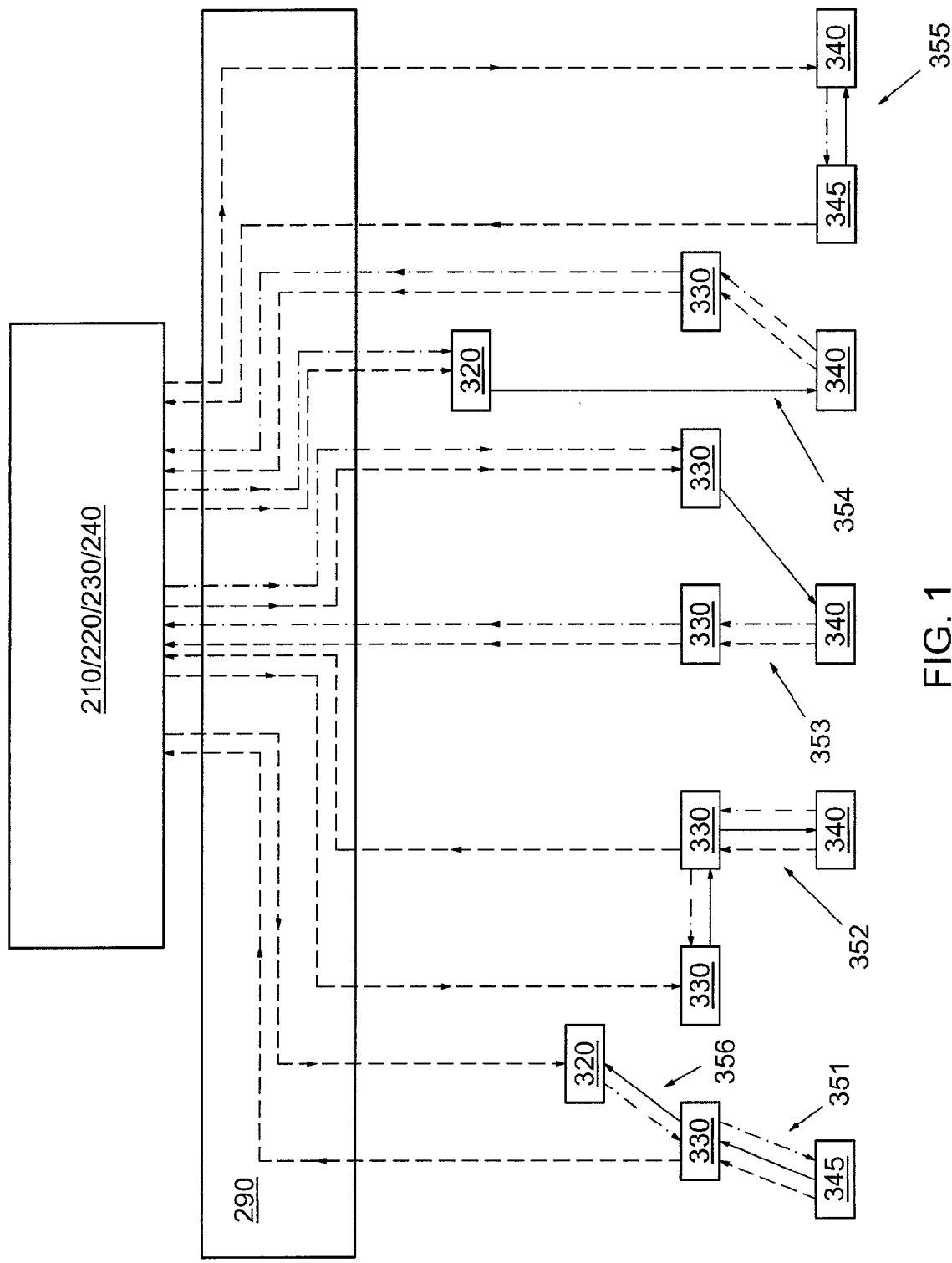
FIG. 1 is a schematic block diagram of a system for acquisition, evaluation, inventory, distribution, and re-sale of pre-owned data products according to the present invention.

In each of the Figures, different line styles with arrows are use to indicate the flow of information (dashed lines with arrows), product (solid lines with arrows), and revenue (dot-dashed lines with arrows).

DETAILED DESCRIPTION OF PREFERRED AND ALTERNATIVE EMBODIMENTS

For purposes of the present written description and/or claims, a recorded data product shall be construed to encompass any information content recorded for storage on and later retrieval from a storage medium. The information may be recorded in analog and/or, preferably, digital format. Examples may include but are not limited to: music compact discs (music CDs), software CDs, data CDs, music tapes, music phonograph recordings, video tapes, video DVDs, music DVDs, software DVDs, data DVDs, DVD audio, floppy discs, hard discs, Zip® discs, Jaz® discs, Super Discs®, random access memory (RAM), read-only memory (ROM), flash memory, volatile media, non-volatile media, compressed media, fixed media, removable media, portable media, combinations thereof, and/or functional equivalents thereof. Systems and methods according to the present invention may be particularly well-suited for use with digitally-recorded data that includes error-correaction codes (ECCs). The description set forth herein may at various points refer specifically to entertainment products, particularly music CDs and video DVDs, for which systems and methods according to the present invention may be particularly applicable, but this should not be construed as limiting the scope of any claim unless specifically recited therein. It should be particularly pointed out that methods and systems according to the present invention may be adapted for future data storage formats, protocols, standards, and/or media while remaining within the scope of inventive concepts disclosed and/or claimed herein.

For purposes of the present written description and/or claims, the term "system" shall generally denote an apparatus for acquisition, evaluation, inventory, distribution, and sales of pre-owned data products according to the present invention, and may also include methods implemented using such an apparatus. For purposes of the present written description and/or claims, the term "online" shall denote an activity which is performed by sending and/or receiving text, data, images, graphics, commands, requests, queries, and so forth over a communications network through an interface device. This may preferably mean using a computer connected to the Internet, but may also include other interface devices (including but not limited to: computers, workstations, terminals, televisions, wireless devices, handheld or "palm-top" devices, electronic organizers, telephones, wireless telephones, messaging units, and the like; combinations thereof; and/or functional equivalents thereof) and other networks (Internet, Internet 2, next-generation Internet, other successors to the Internet, World-Wide Web, telephone networks, local- or wide-area networks, wireless networks, optical networks, satellite-based networks, and the like; combinations thereof; and/or functional equivalents thereof).

The block diagram of FIG. 1 illustrates a system for implementing a preferred method for acquisition, evaluation, inventory, distribution, and re-sale of pre-owned data products according to the present invention. Retail sellers of such data products are generally the most common purchasers and re-sellers 330 of pre-owned, or used, data products. A data product owner 345 having a data product he/she wishes to sell may offer it for purchase by a re-seller 330 (transaction 351). In order to determine an appropriate purchase price, the re-seller preferably inserts the data product, a music CD for example, into an appropriate readout device, a CD drive for the exemplary music CD. Data is read from the music CD to identify the product (by title, artist, UPC code, and/or track information, in this example). This data is used to search a data product information database 210 accessed by the re-seller. If matching data entries are found in the database, these entries may be used to identify the music CD. If there are no matching data entries, the re-seller may be prompted to manually enter information such as title, artist, UPC code, and/or other relevant information for upload to the data product information database. In this way the data product information database 210 may be constantly expanded as previously undocumented products are presented by owners for purchase by a re-seller. At this stage a label may be generated and/or printed for the data product, and may include one or more of: title, content provider, publisher or manufacturer, alphanumeric and/or barcoded UPC, alphanumeric and/or barcoded data integrity rating, alphanumeric and/or barcoded content signature.

Once identified, an appropriate purchase price must be determined for the pre-owned data product. The price may be determined based on inventory information for the data product, pending order information for the data product, sales history information for the data product, a quantitative rating of the integrity of the data set recorded on the data product, or preferably, a combination of all or some of these factors. Inventory, order, and sales information for the data product may be stored in an inventory database 220, an order database 230, and a sales database 240, respectively, and the information therein may be used to determine, at least in part, a purchase price offered by the re-seller to the owner of the data product. For example, if the re-seller already had multiple copies of a particular data product, he/she would presumably offer a lower price to acquire an additional copy, and conversely (based on "supply" information). If the order database listed multiple pending orders for a data product, the re-seller may offer a higher price to acquire a copy of the data product (based on "demand" information). If sales history information showed that the previously-acquired copies of the data product had been re-sold relatively quickly and/or at a relatively high re-sale price, a re-seller would presumably offer a higher price to acquire a copy, and conversely (based on "demand" information). The order database may further include bid information submitted by potential buyers of pre-owned data products, wherein desired data products and offered re-sale prices are listed by buyers searching for particular data products. Such bid information may serve as additional "demand" information for determining a purchase price.

A quantitative evaluation of the integrity of the data set recorded on the data product may be obtained during the initial reading of data from the data product for product identification. The details of various methods for quantitatively evaluating the integrity of the data set recorded on the data product are described in detail hereinbelow. Once such a quantitative determination has been made, a data integrity rating may be computed and used to determine, at least in part, a purchase price offered by the re-seller to the owner of the data product. For example, a music CD with one unplayable track out of fifteen would presumably be less valuable than the same music CD with all tracks playable, but more valuable than one with two or more unplayable tracks. The value may even reside on which track is unplayable (the hit single vs. the obscure flip-side single from a music CD, for example). Two aurally indistinguishable music CDs (i.e., all data readable) may nevertheless have differing degrees of data integrity, if one required a significantly higher rate of over-sampling in order to read out the data. The higher rate of over-sampling may be an indication of potential problems with the recorded data and an indication of impending failure (unreadability and/or uncorrectability).

Once a purchase price is determined by the re-seller 330 and then offered to and accepted by the owner 345, the data product is purchased by the re-seller (transaction 351). A re-sale price is determined by the re-seller based on inventory information for the data product, pending order information and/or bid information for the data product, sales history information for the data product, a quantitative rating of the integrity of the data set recorded on the data product, or preferably, a combination of all or some of these factors, in a manner similar to the purchase price determination described above. The data product inventory database and data product sales database are then updated (which may include the data integrity rating), and the purchased data product is made available for re-sale. While available for re-sale, the offered re-sale price may change and be updated in the databases in response to acquisition of additional copies of the data product and/or re-sale of other copies of the data product. A label may be generated/printed at this point that contains label information listed hereinabove and may further include a re-sale price. Upon re-sale of the product to a buyer 340 (transactions 352, 353, 354, or 355), the databases are updated. The databases may be linked to a point-of-sale data system for facilitating database updates.

The utility of the present invention may be significantly enhanced by making the data product information database 210, the data product inventory database 220, the data product order database 230, and the data product sales database 240 common to multiple independent data product re-sellers 330. This may be done in an online environment via a communications network 290, such as the Internet, for example. A data product purchased from an owner by a re-seller may then be made available for re-sale through the multiple independent re-sellers, thereby increasing the number of potential buyers to whom a pre-owned product may be offered. Each of the multiple independent re-sellers may control which data products of other re-sellers are made available. The system may be configured to offer all available products listed in the data product inventory database. Alternatively, data products available from other re-sellers may be offered to a potential buyer interacting with a first re-seller only when not available from the first re-seller. If a buyer interacting with a first re-seller wishes to buy a data product available from a second re-seller, the second re-seller may ship the re-sold product to the first re-seller for subsequent delivery to the buyer (transaction 352), or the second re-seller may provide direct fulfillment services and ship the data product directly to the buyer (transaction 353). In those instances when a re-sold product is provided by a second re-seller to a buyer interacting with a first re-seller, the revenue generated by the re-sale may be divided between the two re-sellers in any suitable and agreed-upon manner. An administrator of the system may also receive a portion of the generated revenue. A higher price may be charged to the buyer to cover additional shipping/delivery costs, and this may be reflected automatically in the re-sale price in the inventory and sales databases, based on from which re-seller the databases are accessed.

While there are clear advantages to systems and methods according to the present invention and described above, it is also important to enable individual data product re-sellers to maintain independence and autonomy. Systems and methods implemented according to the present invention preferably enable competing participating data product re-sellers to work together without comprising their respective market positions. Each of the multiple re-sellers may control interactions with the other re-sellers. When a re-sold data product is bought through a first re-seller but provided (i.e., fulfilled) by a second re-seller, the entire transaction may be open to the buyer. Alternatively, the identity of the fulfilling re-seller may be concealed form the buyer, or the fact that a second re-seller was involved in the transaction at all may be hidden from the buyer. Similarly, the system and databases may be administered by an independent entity in such a way that the identities of participating re-sellers may be hidden from each other. Each individual re-seller may select which other re-sellers may offer for re-sale data products purchased and inventoried by the individual re-seller, and conversely each individual re-seller may selected from which of the other re-sellers to offer for re-sale to buyers data products purchased and inventoried by the other re-sellers. A re-seller may desire to expand the range of potential buyers to which the re-sellers inventory of pre-owned data products may be offered to a regional or even national level, without necessarily contributing to the revenue stream of a local rival, or even making the local rival aware of participation in the system.

The system and methods according to the present invention may be implemented more efficiently through participation of a distributor 320 of pre-owned products. Shipping and handling costs may be reduced by housing at least a portion of the collective inventory of the multiple participating re-sellers at a common inventory site (transaction 356), and by shipping a substantial fraction of purchased and shipped products from the common inventory site (transaction 354). As products are purchased by the participating multiple independent re-sellers, they are delivered (continuously or periodically) to the distributor (356). Buyer requests for re-sold data products are fulfilled from the distributor inventory (354). Alternatively, to further reduce inventory and shipping costs, a "just-in-time consignment" system may be implemented, similar to a portion of a system described in prior-filed co-pending non-provisional U.S. patent application Ser. No. 09/874,481, cited and incorporated hereinabove. The sales and inventory databases are analyzed to estimate which products are likely to run out and/or be needed for imminent shipment from the distributor inventory, and additional copies of those data products are requested for delivery to the distributor from the re-sellers holding the required data products.

The collection of data product information for out-of-date, out-of-print, rare, or otherwise difficult-to-obtain data products is an ongoing challenge in the various industries offering such data products. Older music CDs, for example, may be absent from industry databases. In addition to the data products themselves, it is frequently desirable to include associated information in the product information databases. Examples include reviews, cover art, printed lyrics, and/or liner notes for music CDs, documentation for software CDs, and so on. If this information is missing initially it may be difficult to acquire later. Systems and methods according to the present invention may be employed to facilitate collection of such material. Each time a data product is presented by an owner for potential purchase by a re-seller is an opportunity for collecting such material. If the data product is not already in the product information database, the re-seller or owner may be prompted by the system to provide the desired some or all of the additional information along with identification of the data product. This may include scanning the cover art, printed lyrics, and/or liner notes in addition to providing title, artist, UPC code, and/or track information for a music CD, for example. In a similar manner, when a data product is identified as already present on the data product information database but lacking some portion of the desired additional information, the re-seller or owner may be prompted by the system to provide the additional information. Financial incentives may be provided to encourage cooperation, such as an increased purchase price offered to the owner, free or discounted shipping for the re-seller, and so forth.

With the advent of downloadable data products online, significant efforts are being exerted to develop algorithms and/or protocols for enabling identification of data content. Such methodologies typically involve some sort of reduction or analysis of the data content to yield a unique identifying "signature", which may then be used for verifying user licenses, enabling play-back or other use of licensed materials, billing for use of the content, and so on. Examples of signature-generation techniques may include spectral analysis, smoothing, generation of digital check-sums, auto- or cross-correlation analysis, derivative analysis, and so on. No single methodology has been fully developed or implemented, nor is it clear which of these methodologies, or some other as-yet-undeveloped methodology, will prove to be implemented on a wide scale. Whatever methodology is employed, its effective implementation will absolutely depend on the availability of cataloged databases containing the appropriate "signature" information for a substantial fraction of, (and ideally all of) the available data content. For example, to fully implement a such a signature system for the music industry, the appropriate analysis must be performed for as many as possible of every track of every music product ever published (digital, such as CDs, or analog such as tapes and phonograph records), including different recordings of the same material. However, systems and methods according to the present invention implemented on a wide scale make it not unlikely that an substantial fraction of all music ever published may pass through the system within a relatively short span of time (perhaps a year or two). The signature and product information databases could be linked to the data integrity evaluation system and methods described hereinbelow, and the required analysis performed and the results added to the signature database in the course of evaluating the data product. Once again, financial incentives could be offered to owners and/or re-sellers to encourage cooperation, although this may be less necessary here since the analysis may be performed along with the data integrity evaluation and need not require additional action on the part of the owner or re-seller. In fact the collection of such analyzed signature data may be concealed from the owner and/or re-seller. The acquisition of such content signatures for data products may be exploited as a significant revenue source.

In alternative embodiments of the present invention, the system databases may be made accessible directly, preferably online, to owners 345 and buyers 340, bypassing the participation of a re-seller (transaction 355). Data integrity evaluation hardware, firmware, and/or, preferably, software (most preferably downloadable online) may be provided to owners of data products. Owners may then evaluate their data products and make them available for re-sale through the system databases. Buyers locating products they may wish to purchase may then conclude a transaction directly with the owner, or the transaction may be mediated by the system. In either case the system (i.e., the entity administering the system) may receive a portion of the revenue generated by the sale. Alternatively, the system may generate revenue through advertising content viewed by buyers and owners using the system. Another revenue generation scenario for the system may rely on parallel use of the system as a vehicle for collecting data pertaining to the data products, as described hereinabove. The data product information and content signature databases may be valuable resources within a given data product industry (the music industry, the video industry, and so on) and by collecting such information through systems and methods according to the present invention significant revenue streams may be generated. The data integrity evaluation services and databases may be made freely available to buyers and owners to insure a high volume of data products flowing through the system for product information, data, and/or content signature acquisition.

A system for implementing methods according to the present invention may be particularly amenable to implementation using a computer. The initial reading of the data and the quantitative data integrity evaluation may be performed by appropriate combinations of computer hardware, software, and/or firmware operated by the re-seller. For implementations involving multiple independent re-sellers, multiple computers may preferably be connected to a communications network 290, such as the Internet. Other communications networks may be equivalently employed. The data product information database, the data product inventory database, the data product order database, and the product sales database may preferably be provided on one or more server computers connected to the communications network and therefore accessible online to the multiple re-sellers. The databases themselves may each comprise a separate self-contained database structure, or may comprise subsets of a single integrated database structure. One of the re-sellers may administer the system, multiple re-sellers may jointly administer the system, multiple re-sellers may administer the system on a rotating basis, or an independent entity may administer the system. If a distributor participates in the system, it may be desirable for the distributor to administer the system. As described hereinabove, and administrator of the system may share in revenue generated by purchase/re-sale transactions facilitated by the system, and/or may generate other revenues related to administration of the system (advertising revenues, data acquisition revenues, and so forth).

Figure 2:
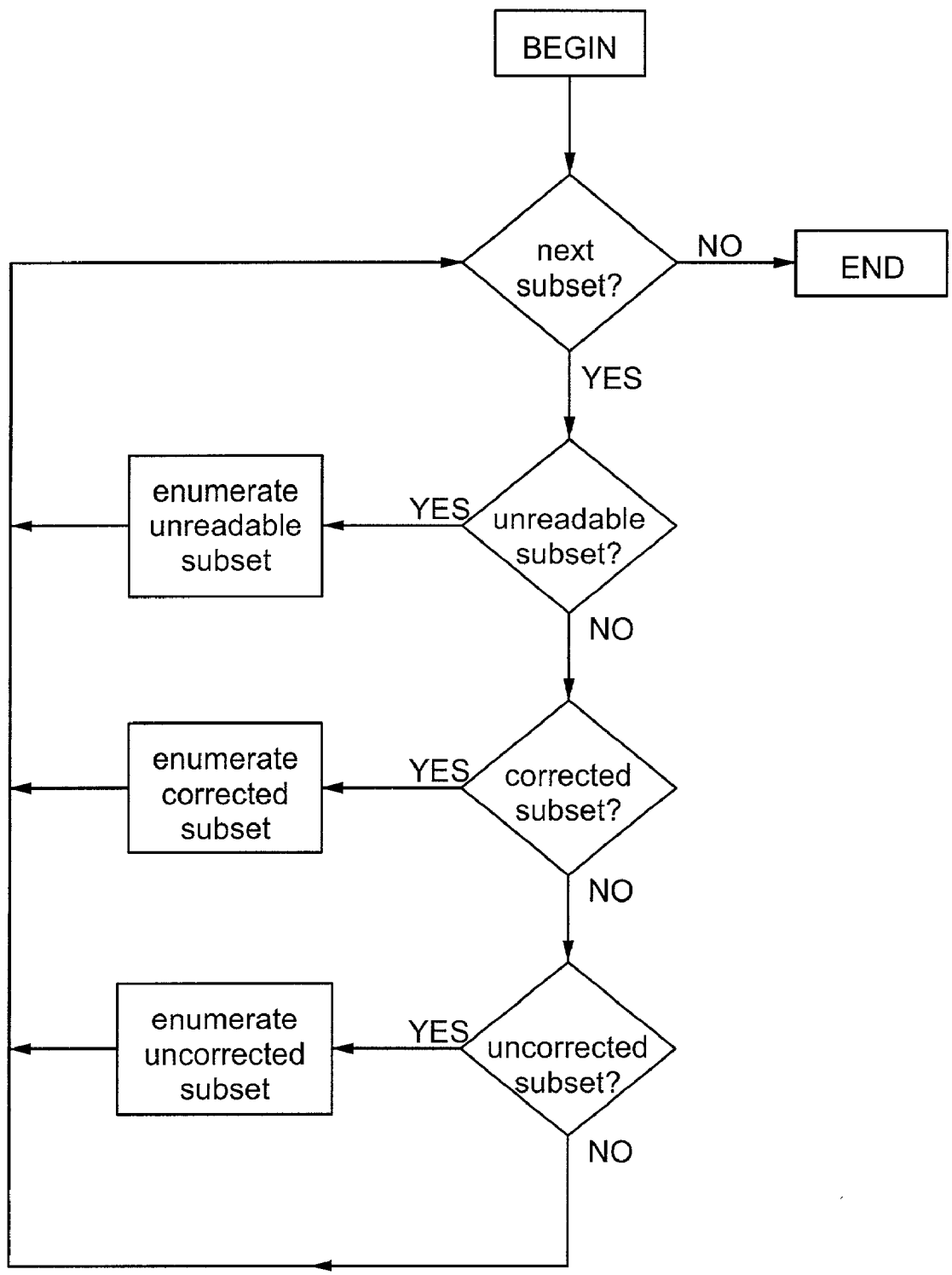
FIG. 2 is a schematic flow diagram for data integrity evaluation according to the present invention.

It is desirable to enable assignment of a quantitative data integrity rating to a data product considered for purchase and/or re-sale by a re-seller. Such a rating may be used to determine, at least in part, appropriate purchase and/or re-sale prices for a pre-owned data product. A simple and general measure of the integrity of a data set recorded on a medium is to simply enumerate data subsets that are unreadable and/or data subsets that are read erroneously, as shown in the flow chart of FIG. 2. These enumerations provide a gross indication of the integrity of the data on recorded on the medium, and may be used individually or combined to compute a data integrity rating for the data set. The integrity evaluation may be performed on the entire data set, or the data set may be divided into subsets and each subset evaluated in turn. A data integrity rating may be computed for each data subset, and the subset ratings in turn combined in some suitable manner to compute a rating for a larger subset or for the entire data set. Subsets of the data set may comprise tracks, sectors, clusters, or other suitable division of the storage medium on which the data set is recorded. By performing the data integrity evaluation on data subsets and identifying and logging unreadable and/or erroneously-read data subsets, not only may a data integrity rating be computed, but the specific locations within the data set (tracks, sectors, clusters, and so on) may be specifically identified.

To enumerate unreadable and/or erroneously-read data, or to identify and log data subsets that are unreadable and/or erroneously-read, the data product (i.e., a storage medium with the data set recorded thereon) is read by a readout device appropriate for the medium (examples including: a CD inserted into a CD drive; a DVD inserted into a DVD drive; a floppy disc inserted into a floppy drive; system access to a hard drive, ROM, or RAM; and so on). The readout device (via hardware, firmware, and/or software control, referred to generically herein as a programmed processor) identifies and logs unreadable and/or erroneously-read data subsets, or may simply monitor the fraction of such data subsets encountered, and reports the results to the system. Such identification and logging of specific data subsets may require direct reading of the medium (via hardware, firmware, and/or software) below the operating system level in a computer system, if the medium readout device does not normally pass such information up to the operating system. If data subsets are identified and logged, they may be identified by any suitable identifying or address information, such as a file designation, track designation, sector number, cluster number, or other suitable identifier. Such identification may be particularly useful when evaluating music CDs, since unreadable and/or erroneously-read tracks or portions of tracks may be specifically identified. Such identification may be particularly useful when evaluating video DVDs, since unreadable or erroneously-read scenes or other portions of the video content may be specifically identified. Such identification may be particularly useful when evaluating software media, since unreadable or erroneously-read programs or files may be specifically identified. Such specific identification of corrupted content is useful in determining proper purchase and/or re-sale prices of partially corrupted data products.

Figure 3:
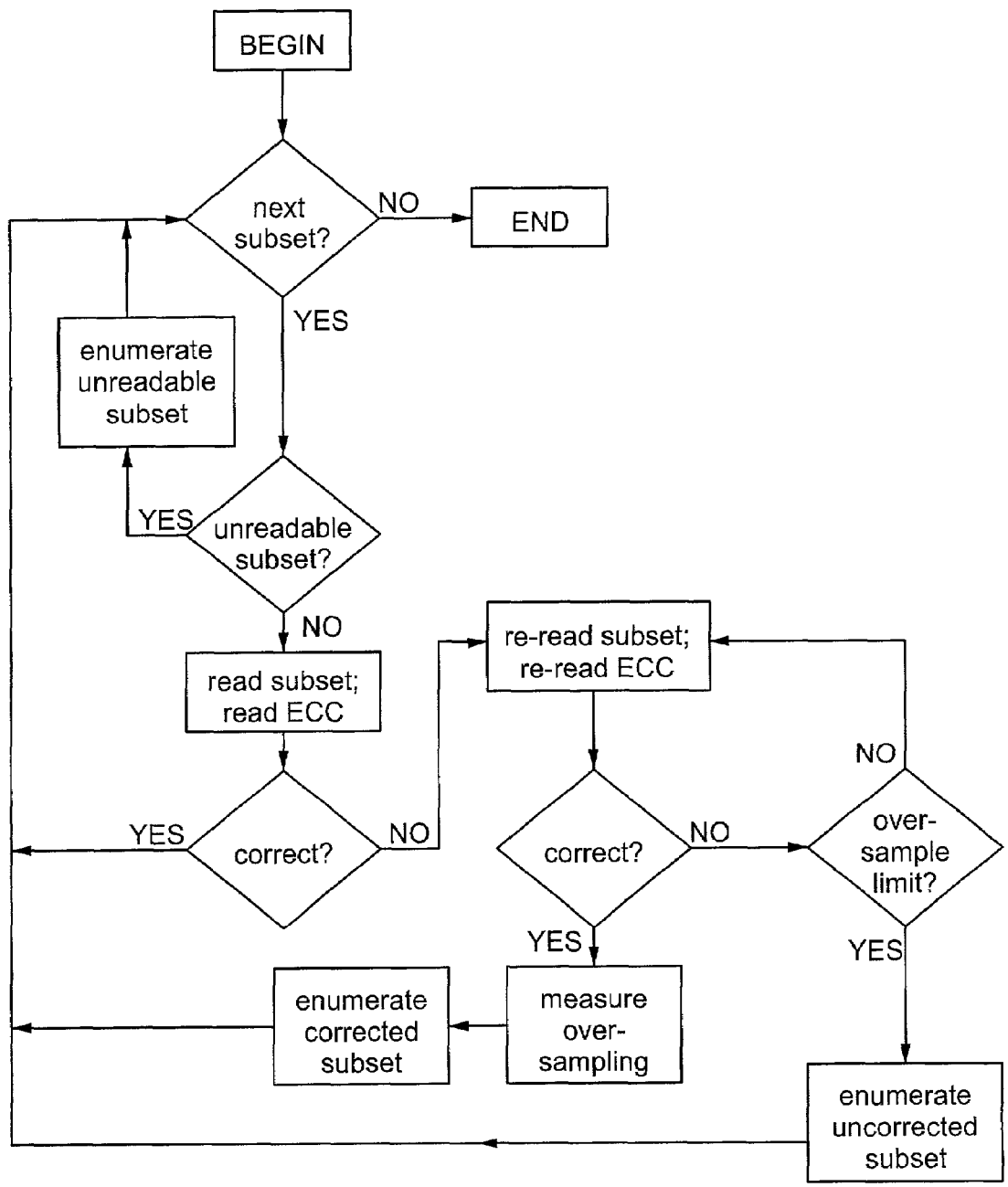
FIG. 3 is a schematic flow diagram for data integrity evaluation according to the present invention.

Many recorded data products contain error-correaction codes (ECCs) that are used to correct erroneously-read data upon one or more additional readings. The additional readings of a data subset for enabling error correaction are referred to as over-sampling. The amount of over-sampling (in terms of fraction of data subsets over-sampled and/or the number of over-samples required to correct a data subset) of the data set during reading of the data set may be used to gauge the integrity of erroneously-read-and-corrected data. In most readout devices over-sampling is limited, and if the over-sampling limit is reached the data remains uncorrected. A general procedure is shown in the flow chart of FIG. 3. While erroneously-read-and-corrected data subsets are normally interpreted as "good" data, the presence of a large fraction of such data subsets and/or a large number of re-reads required to correct a data subset may be an indication of impending failure of the data subset (which would then become erroneously-read or unreadable).

The amount of over-sampling is normally a quantity not generally directly available from within the usual computer operating system environment, but hidden within the workings of the readout device and its internal hardware and/or firmware (CD drive, DVD drive, floppy drive, and so on). In one implementation of the present invention, the readout device may be provided with an auxiliary connection to the system to enable operating system access to over-sampling information. Alternatively, and perhaps more preferably, the hardware and/or firmware of the readout device may be modified, re-programmed, and/or otherwise adapted for enabling direct access to the over-sampling information from the operating system environment (thereby at least partially integrating the readout device and the programmed processor). In yet another alternative scheme, hardware, firmware, and/or software operating below the operating system level may be used for directly accessing the over-sampling information.

It is may desirable to enable measurement of data over-sampling from within an operating system environment without requiring modification, re-programming, or other adaptations of the readout device. Over-sampling may be indirectly quantified based on the time intervals required for reading the data set from the storage medium. This may be done for the entire data set or on smaller data subsets thereof. For each data subset to be evaluated, a time interval is calculated for reading out the data subset at a pre-determined data readout rate (preferably the fastest readout rate available for the readout device/medium combination in use, but any readout rate supported by the readout device and medium may be chosen). The data subset is then read from the medium, and the time interval required for the readout is measured. The measured time interval will generally be longer than the computed time interval due to repetitive reads of initially erroneously-read data that is re-read one or more times and corrected using the error-correaction codes. An indirect measurement of the amount of over-sampling of the data subset may therefore be performed from within the operating system environment without any modification or re-programming of the readout device required. An over-sampled rating may be computed by subtracting the computed time interval from the measured time interval (over-sampled difference), by dividing the measured time interval by the computed time interval (over-sampled factor), or by other suitable computation.

Whether acquired directly or indirectly, such an over-sampled rating may be used for computing a data integrity rating, either alone or in combination with the enumerations of unreadable and/or erroneously-read (-and-uncorrected) data subsets as described hereinabove. For example, any suitable weighted combination of the unreadable fraction, the erroneously-read-and-uncorrected fraction, the erroneously-read-and-corrected fraction, and/or the over-sampled rating may be used to calculate a data integrity rating, for each data subset or for the entire data set as a whole. Separately evaluated data subsets may comprise tracks, clusters, sectors, files, directories, or other appropriate subdivisions of the data storage medium. The unreadable data subsets, erroneously-read-and-uncorrected data subsets, the erroneously-read-and-corrected data subsets may be identified and logged as they are evaluated, thereby providing specific locations for corresponding data subset integrity ratings (track, sector, cluster, file, directory, and so on).

Whichever of these data integrity measurement techniques, or combinations thereof, are used, there will typically be trade-offs between speed and accuracy of the data integrity measurements. Faster data readout from the data product increases the likelihood that errors in the recorded data might be missed It is desirable to provide to buyers of pre-owned data products a way to verify the data integrity ratings generated according to the present invention. Downloadable or online-accessible software may be provided online for buyers to use (after downloading and installing, if a downloadable version is used) to quantitatively evaluate the integrity of the data set on a re-sold data product he/she has purchased, using a non-system readout device. Alternatively, the re-sold product may be evaluated using a system readout device. In either case, the buyer may be reassured of the quality of the pre-owned product, and may verify that the delivered product is the same as the one he/she agreed to buy (presumably based at least in part on the purported data integrity rating). An administrator of the system may offer a pre-owned data product quality guarantee based on the reported data integrity rating for a re-sold product. Owners may utilize the system (using a system readout device, or preferably using downloaded or online accessible software and a non-system readout device) to evaluate the data set integrity of a collection of data products and potential purchase prices that may be offered by re-sellers and/or buyers. Buyers and owners may utilize the system to facilitate trade or barter transactions involving pre-owned data products. The downloadable or online-accessible software may be provided to users at reduced or no charge, thereby enabling owners to do data integrity evaluations of their data products using non-system readout devices. Parallel to any of these opportunities/scenarios for data set integrity evaluations by owners/buyers, using a system readout device or a non-system readout device, data product information may be gathered for inclusion in the data product information database. Similarly, content signature data or other unique data product identification data may be gathered, extracted and/or analyzed from the data product during a data set integrity evaluation and included in a product information database. Revenue may be generated for an administrator of the system from such product information databases, with the provided data set integrity evaluation offered as an incentive for owners to participate, thereby generating the content of the product information database(s).

The present invention has been set forth in the forms of its preferred and alternative embodiments. It is nevertheless intended that modifications to the disclosed systems and methods for acquisition, evaluation, inventory, distribution, and/or re-sale of pre-owned recorded data products may be made without departing from inventive concepts disclosed and/or claimed herein.

What is claimed is:

1. A method for acquisition, evaluation, inventory, distribution, and re-sale of pre-owned recorded data products by a data product re-seller, the method comprising:

reading, using a readout device operatively coupled to a programmed electronic processor, data from a data product offered by an owner of the data product;

comparing, by means of the programmed electronic processor, data read from the data product with data in a data product information database, the product information database residing on a storage medium operatively coupled to the programmed electronic processor;

identifying, by means of the programmed electronic processor, the data product, if the data product is identified as being listed in the data product information database;

enumerating, by means of the programmed electronic processor, a) subsets of the data read from the data product that are unreadable, and subsets of the data read from the data product that are erroneously read and uncorrected or, b) subsets of the data read from the data product that are unreadable, and subsets of the data read from the data product that are initially erroneously read and subsequently corrected, or c) subsets of the data read from the data product that are erroneously read and uncorrected, and subsets of the data read from the data product that are initially erroneously read and subsequently corrected;

computing, by means of the programmed electronic processor, a quantitative data integrity rating for the data product using a) enumeration of subsets of the data read from the data product that are unreadable, and enumeration of subsets of the data read from the data product that are erroneously read and uncorrected or, b) enumeration of subsets of the data read from the data product that are unreadable, and enumeration of subsets of the data read from the data product that are initially erroneously read and subsequently corrected, or c) enumeration of subsets of the data read from the data product that are erroneously read and uncorrected, and enumeration of subsets of the data read from the data product that are initially erroneously read and subsequently corrected;

determining, by means of the programmed electronic processor, a purchase price for the data product to be offered by the re-seller to the owner of the data product, the purchase price being determined based on i) the quantitative data integrity rating for the data product, and ii) inventory information for the data product from a data product inventory database, order information for the data product in a data product order database, or previous purchase and re-sale information for the data product from a data product sales database, the data product inventory database, the data product order database, and the data product sales database residing on a storage medium operatively coupled to the programmed electronic processor;

updating, by means of the programmed electronic processor and in response to a purchase of the data product from the owner by the re-seller, inventory information for the data product in the data product inventory database;

determining, by means of the programmed electronic processor, a re-sale price for the data product to be offered by the re-seller to a buyer of the data product, the re-sale price being determined based on i) the quantitative data integrity rating for the data product, and ii) inventory information for the data product in the data product inventory database, order information for the data product in the data product order database, or purchase and re-sale information for the data product in the data product sales database; and updating, by means of the programmed electronic processor and in response to a re-sale of the data product by the re-seller to the buyer, inventory information for the data product in the data product inventory database, order information for the data product in the data product order database, or purchase and re-sale information for the data product in the data product sales database.

2. The method of claim 1, wherein the data product comprises a CD.

3. The method of claim 1, wherein the data product comprises a DVD.

4. The method of claim 1, further comprising prompting a user to enter data product information for the data product into the data product information database, if the data product is not identified as being listed in the product information database.

5. The method of claim 1, wherein the data product is a music CD, the data product databases are music CD databases, and the method further comprises:

reading and storing in the music CD information database any of track information, title, and artist from the CD that is not already stored in the music CD database;

prompting a user to scan cover art of the music CD and storing cover art thus scanned into the music CD information database, if the cover art is not already present in the music CD database;

prompting a user to scan lyrics of the music CD and storing lyrics thus scanned into the music CD information database, if the lyrics are not already present in the music CD database; or prompting a user to scan liner notes of the music CD and storing liner notes thus scanned into the music CD information database, if the liner notes are not already present in the music CD database.

6. The method of claim 1, wherein the data product is a music CD, the data product information database is a music CD information database, and the method further comprises:
- analyzing, by means of the programmed electronic processor, music data recorded on tracks of the music CD to generate unique track identification data therefor; and
- storing the generated track identification information in the music CD information database.

7. The method of claim 1, further comprising enabling the buyer independently to evaluate quantitatively the integrity of the data set recorded on a re-sold data product and to compute the quantitative data integrity rating for the re-sold data product, thereby enabling the buyer to verify the quantitative data integrity rating of the re-sold data product and to compare it to a re-seller-reported quantitative data integrity rating.

8. A method for acquisition, evaluation, inventory, distribution, and re-sale of pre-owned recorded data products by a data product re-seller, the method comprising:
- reading, using a readout device operatively coupled to a programmed electronic processor, data from a data product offered by an owner of the data product;
- comparing, by means of the programmed electronic processor, data read from the data product with data in a data product information database, the product information database residing on a storage medium operatively coupled to the programmed electronic processor;
- identifying, by means of the programmed electronic processor, the data product, if the data product is identified as being listed in the data product information database;
- enumerating, by means of the programmed electronic processor, data subsets that are initially erroneously read and subsequently corrected using error correaction codes included on the data product;
- computing, by means of the programmed electronic processor, a quantitative data integrity rating for the data set using the enumeration of erroneously-read-and-corrected data subsets;
- determining, by means of the programmed electronic processor, a purchase price for the data product to be offered by the re-seller to the owner of the data product, the purchase price being determined based on i) the quantitative data integrity rating for the data product, and ii) inventory information for the data product from a data product inventory database, order information for the data product in a data product order database, or previous purchase and re-sale information for the data product from a data product sales database, the data product inventory database, the data product order database, and the data product sales database residing on a storage medium operatively coupled to the programmed electronic processor;
- updating, by means of the programmed electronic processor and in response to a purchase of the data product from the owner by the re-seller, inventory information for the data product in the data product inventory database;
- determining, by means of the programmed electronic processor, a re-sale price for the data product to be offered by the re-seller to a buyer of the data product, the re-sale price being determined based on i) the quantitative data integrity rating for the data product, and ii) inventory information for the data product in the data product inventory database, order information for the data product in the data product order database, or purchase and re-sale information for the data product in the data product sales database; and
- updating, by means of the programmed electronic processor and in response to a re-sale of the data product by the re-seller to the buyer, inventory information for the data product in the data product inventory database, order information for the data product in the data product order database, or purchase and re-sale information for the data product in the data product sales database.

9. The method of claim 8, wherein the data product comprises a CD.

10. The method of claim 8, wherein the data product comprises a DVD.

11. The method of claim 8, further comprising prompting a user to enter data product information for the data product into the data product information database, if the data product is not identified as being listed in the product information database.

12. The method of claim 8, wherein the data product is a music CD, the data product databases are music CD databases, and the method further comprises:
- reading and storing in the music CD information database any of track information, title, and artist from the CD that is not already stored in the music CD database;
- prompting a user to scan cover art of the music CD and storing cover art thus scanned into the music CD information database, if the cover art is not already present in the music CD database;
- prompting a user to scan lyrics of the music CD and storing lyrics thus scanned into the music CD information database, if the lyrics are not already present in the music CD database; or
- prompting a user to scan liner notes of the music CD and storing liner notes thus scanned into the music CD information database, if the liner notes are not already present in the music CD database.

13. The method of claim 8, wherein the data product is a music CD, the data product information database is a music CD information database, and the method further comprises:
- analyzing, by means of the programmed electronic processor, music data recorded on tracks of the music CD to generate unique track identification data therefor; and
- storing the generated track identification information in the music CD information database.

14. The method of claim 8, further comprising enabling the buyer independently to evaluate quantitatively the integrity of the data set recorded on a re-sold data product and to compute the data integrity rating for the re-sold data product, thereby enabling the buyer to verify the data integrity rating of the re-sold data product and to compare it to re-seller-reported data integrity rating.

15. A method for acquisition, evaluation, inventory, distribution, and re-sale of pre-owned recorded data products by a data product re-seller, the method comprising:
- reading, using a readout device operatively coupled to a programmed electronic processor, data from a data product offered by an owner of the data product;
- comparing, by means of the programmed electronic processor, data read from the data product with data in a data product information database, the product information database residing on a storage medium operatively coupled to the programmed electronic processor;
- identifying, by means of the programmed electronic processor, the data product, if the data product is identified as being listed in the data product information database;

enumerating, by means of the programmed electronic processor, data subsets that are initially erroneously read and subsequently corrected using error correaction codes included on the data product;

determining, by means of the programmed electronic processor, an over-sampled rating for the erroneously-read-and-corrected data subsets;

computing, by means of the programmed electronic processor, a quantitative data integrity rating for the data product using enumeration of the erroneously-read-and-correct data subsets and the over-sampled rating of the erroneously-read-and-corrected data subsets;

determining, by means of the programmed electronic processor, a purchase price for the data product to be offered by the re-seller to the owner of the data product, the purchase price being determined based on i) the quantitative data integrity rating for the data product, and ii) inventory information for the data product from a data product inventory database, order information for the data product in a data product order database, or previous purchase and re-sale information for the data product from a data product sales database, the data product inventory database, the data product order database, and the data product sales database residing on a storage medium operatively coupled to the programmed electronic processor;

updating, by means of the programmed electronic processor and in response to a purchase of the data product from the owner by the re-seller, inventory information for the data product in the data product inventory database;

determining, by means of the programmed electronic processor, a re-sale price for the data product to be offered by the re-seller to a buyer of the data product, the re-sale price being determined based on i) the quantitative data integrity rating for the data product, and ii) inventory information for the data product in the data product inventory database, order information for the data product in the data product order database, or purchase and re-sale information for the data product in the data product sales database; and updating, by means of the programmed electronic processor and in response to a re-sale of the data product by the re-seller to the buyer, inventory information for the data product in the data product inventory database, order information for the data product in the data product order database, or purchase and re-sale information for the data product in the data product sales database.

16. The method of claim 15, wherein the data product comprises a CD.

17. The method of claim 15, wherein the data product comprises a DVD.

18. The method of claim 15, further comprising prompting a user to enter data product information for the data product into the data product information database, if the data product is not identified as being listed in the product information database.

19. The method of claim 15, wherein the data product is a music CD, the data product databases are music CD databases, and the method further comprises:

reading and storing in the music CD information database any of track information, title, and artist from the CD that is not already stored in the music CD database;

prompting a user to scan cover art of the music CD and storing cover art thus scanned into the music CD information database, if the cover art is not already present in the music CD database;

prompting a user to scan lyrics of the music CD and storing lyrics thus scanned into the music CD information database, if the lyrics are not already present in the music CD database; or prompting a user to scan liner notes of the music CD and storing liner notes thus scanned into the music CD information database, if the liner notes are not already present in the music CD database.

20. The method of claim 15, wherein the data product is a music CD, the data product information database is a music CD information database, and the method further comprises:

analyzing, by means of the programmed electronic processor, music data recorded on tracks of the music CD to generate unique track identification data therefor; and storing the generated track identification information in the music CD information database.

21. The method of claim 15, further comprising enabling the buyer independently to quantitatively evaluate the integrity of the data set recorded on a re-sold data product and to compute the data integrity rating for the re-sold data product, thereby enabling the buyer to verify the data integrity rating of the re-sold data product and compare it to re-seller-reported data integrity rating.

* * * * *